US011061982B2

(12) United States Patent
DeLuca et al.

(10) Patent No.: US 11,061,982 B2
(45) Date of Patent: Jul. 13, 2021

(54) SOCIAL MEDIA TAG SUGGESTION BASED ON PRODUCT RECOGNITION

(71) Applicant: International Business Machines Corporation, Armonk, NY (US)

(72) Inventors: Lisa Seacat DeLuca, Baltimore, MD (US); Jeremy A. Greenberger, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 16/212,432

(22) Filed: Dec. 6, 2018

(65) Prior Publication Data

US 2020/0183996 A1   Jun. 11, 2020

(51) Int. Cl.
| | |
|---|---|
| *G06F 16/95* | (2019.01) |
| *G06F 16/9536* | (2019.01) |
| *G06F 16/9032* | (2019.01) |
| *G06F 16/906* | (2019.01) |
| *G06K 9/32* | (2006.01) |

(52) U.S. Cl.
CPC ........ *G06F 16/9536* (2019.01); *G06F 16/906* (2019.01); *G06F 16/90324* (2019.01); *G06K 9/3241* (2013.01)

(58) Field of Classification Search
CPC .................................................. G06F 16/906
USPC ....................................................... 707/767
See application file for complete search history.

(56) References Cited

U.S. PATENT DOCUMENTS

| | | | |
|---|---|---|---|
| 9,858,298 B1* | 1/2018 | Barak | G06F 16/27 |
| 10,250,547 B1* | 4/2019 | Jain | H04L 51/32 |
| 2014/0095484 A1* | 4/2014 | Kursar | G06Q 30/0201 |
| | | | 707/722 |
| 2014/0280739 A1 | 9/2014 | Ljubin | |
| 2015/0081703 A1* | 3/2015 | Murphy-Chutorian | |
| | | | G06F 16/5866 |
| | | | 707/736 |
| 2015/0348097 A1* | 12/2015 | Andrianakou | G06F 16/955 |
| | | | 705/14.49 |
| 2016/0188567 A1* | 6/2016 | Pasternack | H04W 4/21 |
| | | | 704/9 |
| 2016/0189040 A1* | 6/2016 | Vickrey | G06F 40/284 |
| | | | 706/12 |
| 2017/0052954 A1 | 2/2017 | State et al. | |
| 2017/0103071 A1 | 4/2017 | Albouyeh et al. | |
| 2017/0220652 A1* | 8/2017 | Kazi | G06Q 50/01 |
| 2018/0060157 A1* | 3/2018 | Packham | G06F 16/9535 |
| 2018/0107660 A1* | 4/2018 | Wang | G06F 16/10 |
| 2018/0196806 A1* | 7/2018 | Scapa | G06F 16/686 |
| 2018/0203841 A1* | 7/2018 | Anders | H04L 67/306 |
| 2019/0258671 A1* | 8/2019 | Bou | G06K 9/00751 |

(Continued)

OTHER PUBLICATIONS http://www.hashtaggenerator.com/ Downloaded on Dec. 6, 2018.

(Continued)

*Primary Examiner* — Eliyah S. Harper
(74) *Attorney, Agent, or Firm* — L. Jeffrey Kelly

(57) ABSTRACT

A method, system and computer program product for suggesting a social media tag based on image recognition, by: accessing a social media post including a media object; performing the image recognition on the media object to identify one or more contents of the media object; and suggesting the social media tag based on the contents of the media object.

15 Claims, 6 Drawing Sheets

(56) References Cited

U.S. PATENT DOCUMENTS

2020/0057820 A1* 2/2020 Anders ............... G06F 16/9535
2020/0183996 A1* 6/2020 DeLuca ............. G06K 9/00664

OTHER PUBLICATIONS https://www.clarifai.com/ Downloaded on Dec. 6, 2018.
Frederic Lardinois, "Google's new machine learning API recognizes objects in videos". Tech Crunch, 2016, 6 pages, https://techcrunch.com/2017/03/08/googles-new-%20machine-learning-api-recognizes-objects-in-videos/.
https://en.wikipedia.org/wiki/Computer vision 12 pages, Downloaded on Dec. 6, 2018.
IBM, "Watson Visual Recognition", Quickly and accurately tag, classify and search visual content using machine learning, https://www.ibm.com/cloud/watson-visual-recognition, Accessed on Jun. 17, 2020, 6 pages.

* cited by examiner

SOCIAL MEDIA TAG SUGGESTION BASED ON PRODUCT RECOGNITION

BACKGROUND

The present invention relates generally to a method and system for social media tag suggestion based on image recognition.

Using hashtags for social media messages is expected currently. For example, a person can post a message on Twitter™ and Twitter™ provides suggestions of the most common tags to add, based on the person typing a one or a few or more characters of the message.

However, users often incorrectly use hash tags. The problem is that a post that is incorrectly tagged will not show up when others search for posts that are correctly tagged.

Moreover, it is hard for the system itself to suggest tags to use within the context of a short message, for example, as a 280 character message on Twitter™.

What is needed, then, are improved methods for suggesting tags to a user based on the context of the message. The present invention satisfies this need.

SUMMARY

The invention provided herein has many embodiments useful, for example, in implementing a method, system and computer program product for suggesting a social media tag based on image recognition, by: accessing a social media post including a media object, such as an image; performing the image recognition on the media object to identify one or more contents of the media object; and suggesting the social media tag based on the contents of the media object.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof, and in which is shown by way of illustration one or more specific embodiments in which the invention may be practiced. It is to be understood that other embodiments may be utilized, and structural and functional changes may be made without departing from the scope of the present invention.

Overview

The present invention discloses is a method and system for suggesting social media tags based on recognition of the contents of one or more media objects. In this context, the media object may comprise images, video, photos, pictures, graphics, and the like, and the contents may comprise people, locations, things, and the like. Specifically, the contents of the media objects are used to suggest tags for social media posts. The method and system can be used with social media web sites, such as Twitter™, Instagram™, Facebook™, etc.

Cloud Computing Environment

Figure 1:
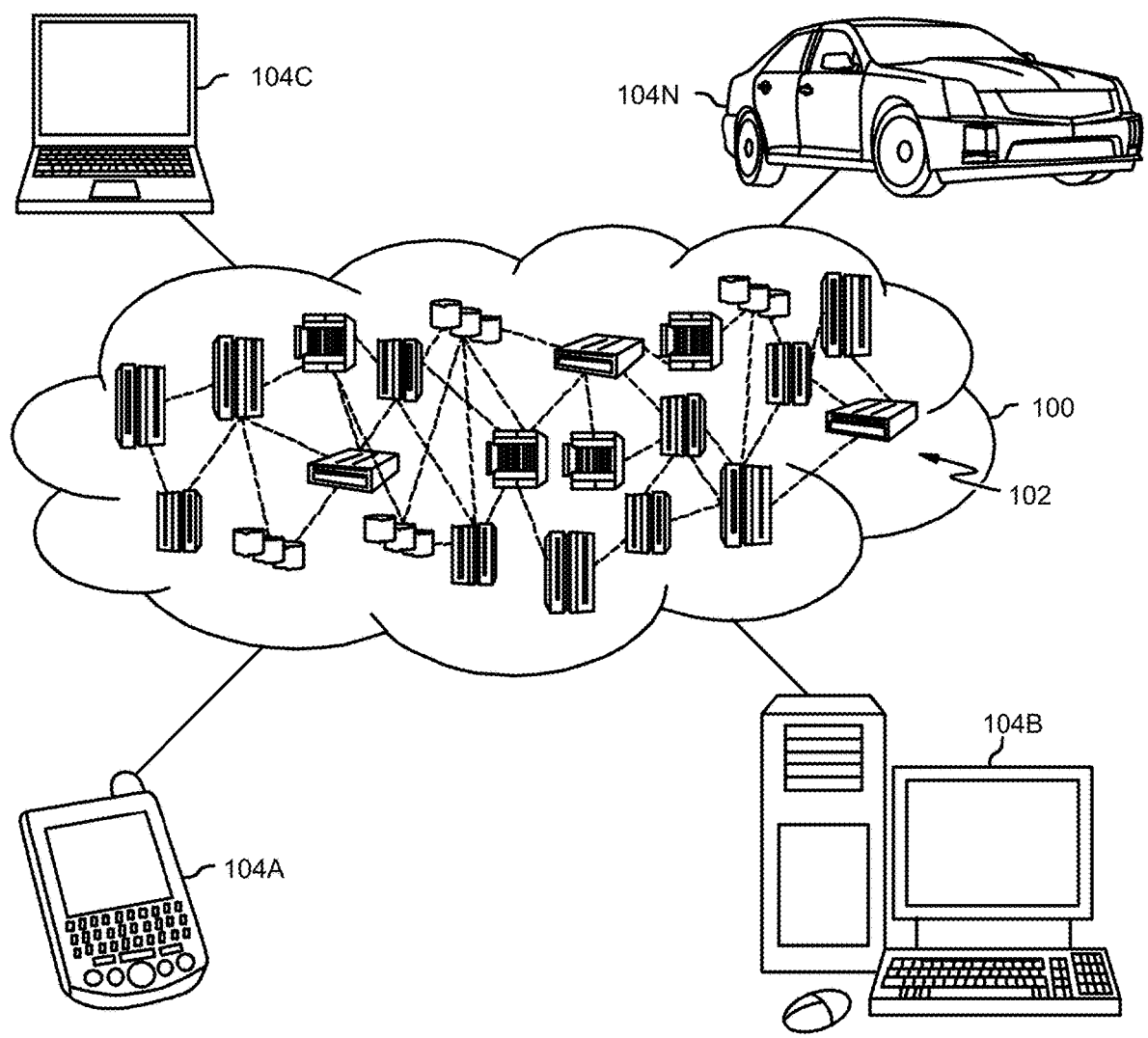
FIG. 1 is a pictorial representation of an illustrative cloud computing environment used for implementing social media tag suggestion based on image recognition.

FIG. 1 is a pictorial representation of an illustrative cloud computing environment 100 used for implementing social media tag suggestion based on image recognition, according to one embodiment.

As shown, a cloud computing environment 100 includes one or more cloud computing nodes 102 with which local computing devices used by cloud consumers, such as, for example, personal digital assistant (PDA) or cellular telephone 104A, desktop computer 104B, laptop computer 104C, and/or automobile computer system 104N may communicate. Nodes 102 may communicate with one another. They may be grouped (not shown) physically or virtually, in one or more networks, such as Private, Community, Public, or Hybrid clouds, or a combination thereof. This allows cloud computing environment 100 to offer infrastructure, platforms and/or software as services for which a cloud consumer does not need to maintain resources on a local computing device. It is understood that the types of computing devices 104A-N shown in FIG. 1 are intended to be illustrative only and that computing nodes 102 and cloud computing environment 100 can communicate with any type of computerized device over any type of network and/or network addressable connection (e.g., using a web browser).

The computing nodes 102 and/or computing devices 104A-N perform various functions and steps as described in more detail below.

System Description

Figure 2:
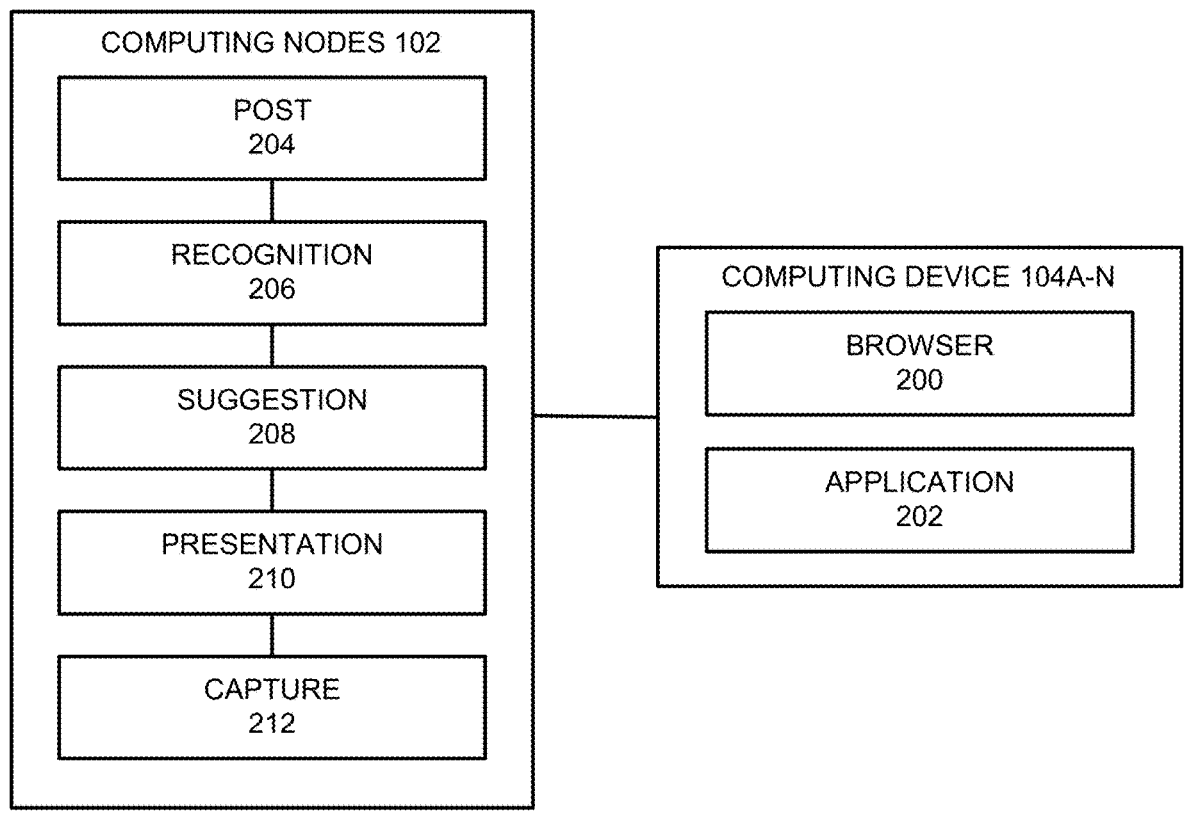
FIG. 2 is a block diagram illustrating how the system and method for social media tag suggestion based on image recognition is implemented, according to one embodiment.

FIG. 2 is a block diagram illustrating how the system and method for social media tag suggestion based on image recognition are implemented, according to one embodiment. In this embodiment, the system and method are implemented as follows:

a browser 200 or application 202 executed on a user's computing device 104A-N posts a message including one or more media objects to a social media web site as well as text; and a plurality of modules 204-212 executed on the computing nodes 102 analyze the message in order to infer one or more tags for the post based on the contents of the media objects, and optionally the text.

In alternative embodiments, these functions and steps may be wholly or partially performed on the computing nodes 102 and/or computing devices 104A-N.

In a Post step or function 204, the user accesses the social media web site using the browser 200 or application 202 executed on the computing device 104A-N, to create a post including one or more media objects and optionally text. The post including the media objects are transmitted to and/or accessed by the computing nodes 102 for image recognition processing and uploaded to the social media web site.

In a Recognition step or function 206, the computing nodes 102 perform the image recognition processing, and optionally text analytics.

In one embodiment, the computing nodes 102 provide the functionality associated with the Watson™ Visual Recognition service offered by International Business Machines, the assignee of the present invention. However, other image recognition services could also be used.

The Watson™ Visual Recognition service uses deep learning algorithms to analyze media objects for scenes, objects, faces, and other content. The response includes keywords that provide information about the content.

In another embodiment, the computing nodes 102 also provide the functionality associated with the Watson™ Natural Language Understanding service offered by International Business Machines, the assignee of the present invention. However, other text analytics could also be used.

The Watson™ Natural Language Understanding service uses text analytics to extract entities, relationships, keywords, semantic roles, and the like from any text associated with the post. The response includes this information about the text.

In a Suggestion step or function 208, the computing nodes 102 generate one or more suggested tags related to the contents of the media object, and optionally the text analytics. Such tags may be tags already in use on the social media web site, wherein the suggested social media tag is selected from one or more categories of social media tags identified as, but not limited to, the following: trending, popular, mentioned by friends, last used by a user's account, or mentioned by other associations, groups or organizations.

In a Presentation step or function 210, the computing nodes 102 present one or more of the suggested tags to the user for selection on the display of their computing device 104A-N. The tags may be presented in various orders and annotated in various manners. The tags could be presented through traditional tag suggestion tools, such as:

a. type-ahead, e.g., typing "#" shows the tags from the Suggestion step or function 206;
b. type-ahead replacement, e.g., typing "#redcan", which is a tag identified by the Suggestion step or function 206, also suggests "#cocacola", which is a popular or trending tag;
c. drop-down list, e.g., a list of tags from the Suggestion step or function 206 is presented to the user for selection, such as "#cocacola", "#coke", "#mycoke", "#cokerewards", "#refreshing";
d. hover, which triggers the display of the tag suggestions when a user places a cursor over a designated area; and
e. after-tag suggestions, e.g., the user types "#stpattysday", but the tag "#stpatricksday" is suggested, because it is more popular.

In addition, the computing nodes 102 may issue a warning when the social media tag cannot be suggested from the contents of the image.

The computing nodes 102 also may overlay the social media tag on the media object. In one embodiment, during the Recognition step or function 206, the computing nodes 102 determine the locations of the contents of the media object and, during the Presentation step or function 210, the social media tag selected by the user is overlaid on the media object adjacent to or near the location of the contents associated with the selected social media tag.

In a Capture step or function 212, the computing nodes 102 maintain a database including a statistical model based on the tags selected or not selected by the user. For example, if the user decides not to use the tags suggested by the computing nodes 102, but instead uses other tags, the database may capture the tags used and update the statistical model to include the newly added tags for the identified items. These user interactions and behaviors can be fed back into the visual recognition system as training.

These steps 204-212 may be repeated as necessary, and any one or more of the steps 204-212 may be omitted as required.

Use Case

Consider the following use case for social media tag suggestion based on image recognition. This use case is illustrated in FIGS. 3A, 3B and 3C.

Figure 3A:
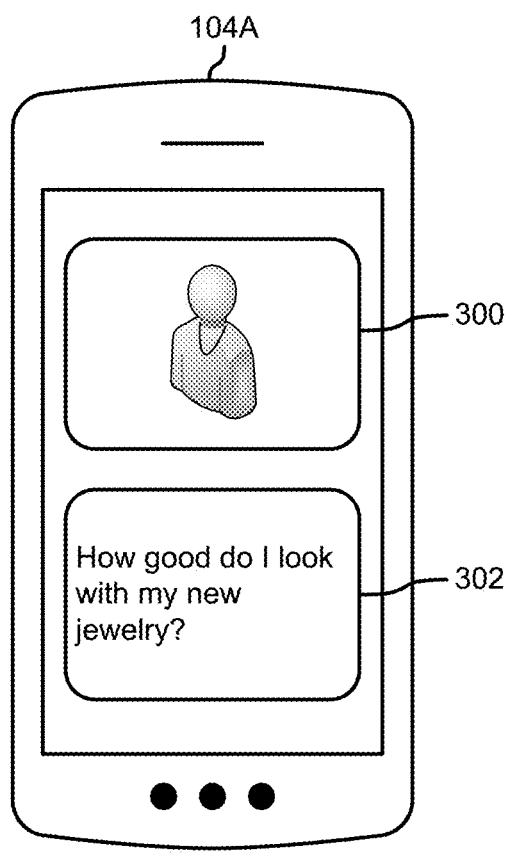
FIGS. 3A, 3B and 3C illustrate a use case for social media tag suggestion based on image recognition, according to one embodiment.
Figure 3B:
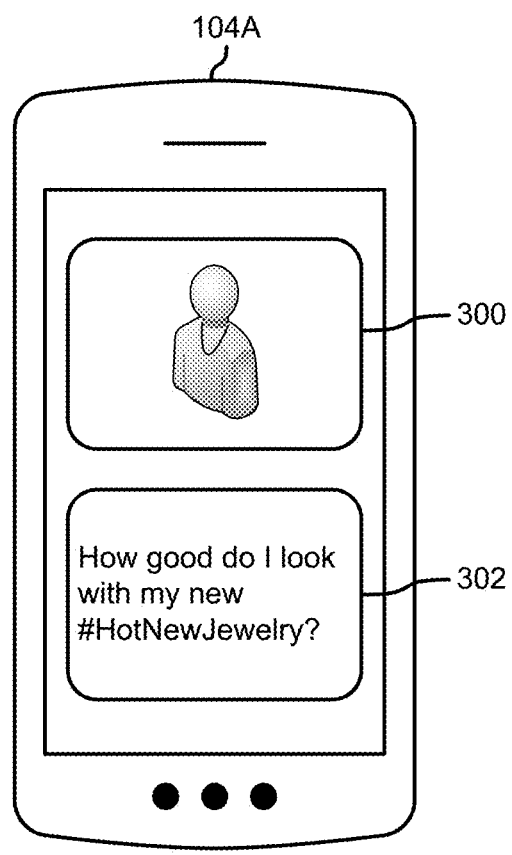
Figure 3C:
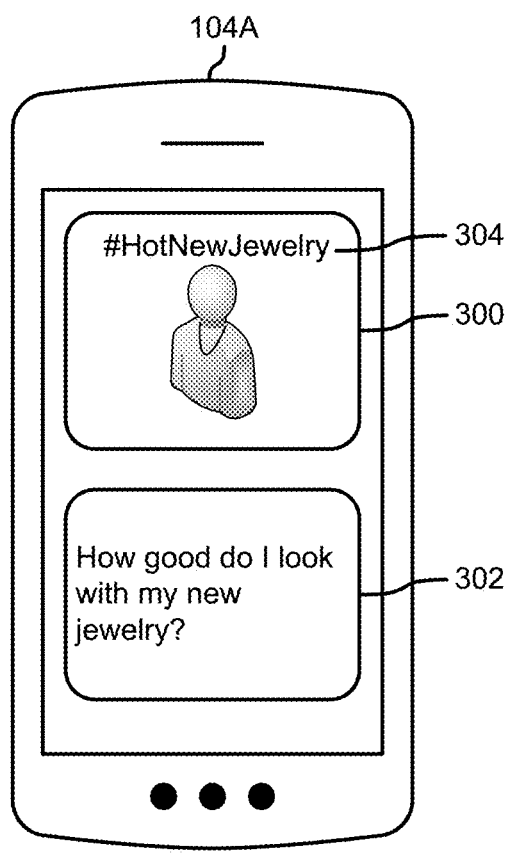

In this example, Mary is posting a picture on a social media web site for her friends from her phone 104A, as shown in FIG. 3A. She selects a media object 300 comprising an image 300 and then enters comments 302 about the image 300, e.g., "How good do I look with my new jewelry?".

Using this invention, the image 300 is transmitted from the computing device 104A to the computing nodes 102 for image recognition processing to determine the contents of the image 300, which includes a woman, shirt and necklace. The computing nodes 102 determine that woman, shirt, necklace, jewelry, are all tags associated with the image 300. The computing nodes 102 then compare these tags with popular or trending tags, and determine that one trending tag currently on the social media web site is "#HotNewJewelry". This new tag is therefore suggested to the user as she is posting the image 300 to the social media web site. Once selected, the tag "#HotNewJewelry" may be embedded in the comments 302 (and may replace a portion of the original comments) as shown in FIG. 3B, or the tag "#HotNewJewelry" may be overlaid 304 on the image 300 adjacent to or near the location of the contents associated with the tag as shown in FIG. 3C.

Additional Considerations

If a person is about to submit a media object such as an image in a post, but the image does not match any popular or trending tags, the invention may issue a warning and a shortcut to change the current tags. For example, if a person uploads a photo with an airplane of a particular airline, and types in the hashtag "#NewAirlineMotto", the user can be warned that most people are using the tag "#NewAirlineMottos" (with an additional 's' at the end of the tag).

While this invention describes the use of media objects embedded in posts, it could also be extended to media objects that are linked in the messages by means of a URL (uniform resource locater). In this example, the linked media object is analyzed to suggest tags.

In addition, this invention can be used when a person is replying or commenting on a post. For example, if the person is commenting about an image that was uploaded by a friend.

Statutory Subject Matter

It can be seen that the present invention provides a number of benefits and advantages. These benefits and advantages include improvements to the technology or technical field of social media and tag suggestions, and more specifically, for social media tag suggestion based on image recognition. For example, the present invention enhances the social aspects of tag suggestions, allowing people to share popular tags, which results in increased activity.

These benefits and advantages also include improvements to the functioning of the devices themselves, including the cloud computing environment 100 generally and the computing nodes 102 specifically, as well as the computing devices 104A-N, as compared to prior computer-implemented methods and systems for social media tag suggestion.

For example, the present invention improves the functioning of the computing devices 104A-N themselves, by expanding social media tag suggestion to include tag suggestion based on image recognition. Moreover, the invention is applied to a particular machine, namely, the computing devices 104A-N and/or the computing nodes 102 performing the associated functionality of tag suggestion based on image recognition. Using the present invention, the computing devices 104A-N and/or the computing nodes 102 can benefit from network effects, as the associated functionality increases the number of users.

Both generally and specifically, these steps and functions of the computer-implemented method and system comprise specific improvements other than what is well-understood, routine and conventional in the field. Moreover, these steps and functions of the computer-implemented method and system add unconventional steps to a particular useful application.

Cloud Computing

It is to be understood that this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring again to FIG. 1, illustrative cloud computing environment 100 is depicted. As shown, cloud computing environment 100 includes one or more cloud computing nodes 102 with which local computing devices used by cloud consumers, such as, for example, personal digital assistant (PDA) or cellular telephone 104A, desktop computer 104B, laptop computer 104C, and/or automobile computer system 104N may communicate. Nodes 102 may communicate with one another. They may be grouped (not shown) physically or virtually, in one or more networks, such as Private, Community, Public, or Hybrid clouds as described hereinabove, or a combination thereof. This allows cloud computing environment 100 to offer infrastructure, platforms and/or software as services for which a cloud consumer does not need to maintain resources on a local computing device. It is understood that the types of computing devices 104A-N shown in FIG. 1 are intended to be illustrative only and that computing nodes 102 and cloud computing environment 100 can communicate with any type of computerized device over any type of network and/or network addressable connection (e.g., using a web browser).

Figure 4:
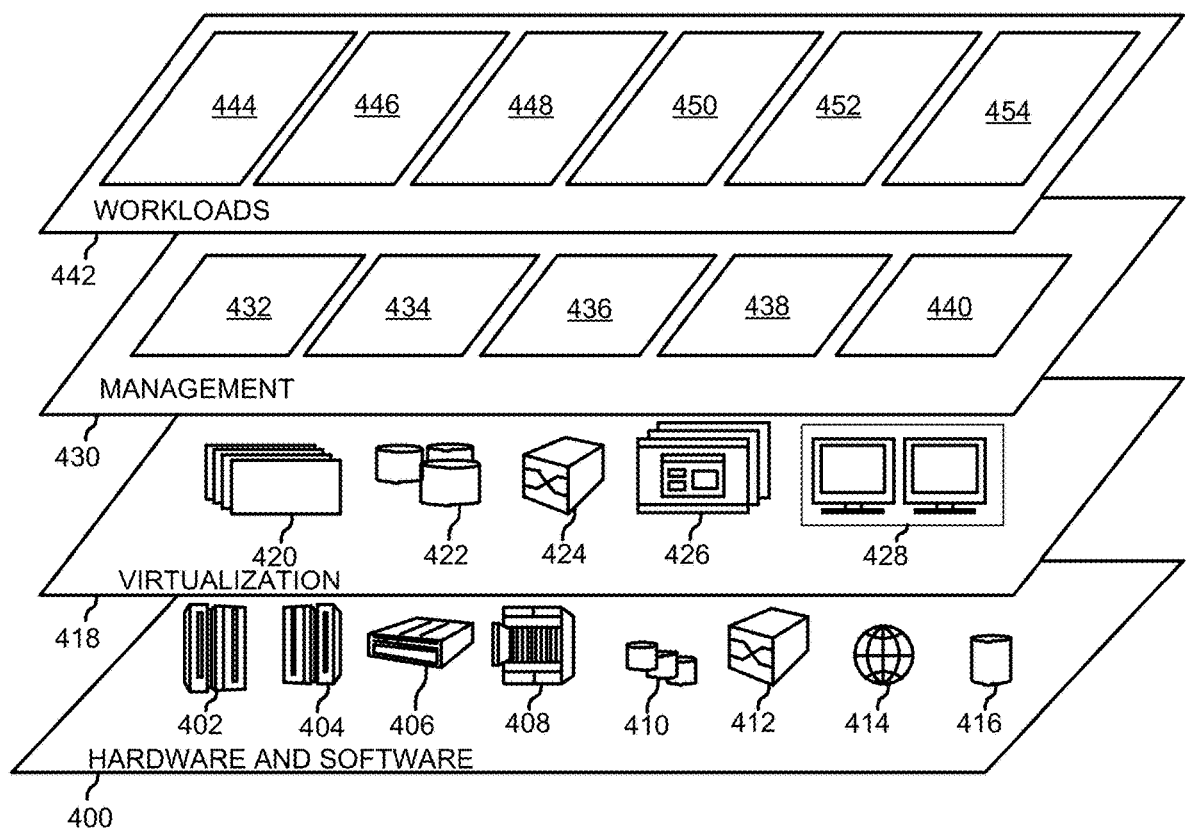
FIG. 4 illustrates a set of functional abstraction layers provided by the cloud computing environment.

Referring now to FIG. 4, a set of functional abstraction layers provided by cloud computing environment 100 (FIG. 1) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 400 includes hardware and software components. Examples of hardware components include: one or more computers such as mainframes 402; RISC (Reduced Instruction Set Computer) architecture based servers 404; servers 406, and blade servers 408; storage devices 410; and networks and networking components 412. In some embodiments, software components include network application server software 414 and database software 416.

Virtualization layer 418 provides an abstraction layer from which the following examples of virtual entities may be provided: virtual servers 420; virtual storage 422; virtual networks 424, including virtual private networks; virtual applications and operating systems 426; and virtual clients 428.

In one example, management layer 430 may provide the functions described above. Resource provisioning 432 provides dynamic procurement of computing resources and other resources that are utilized to perform tasks within the cloud computing environment 100. Metering and pricing 434 provide cost tracking as resources are utilized within the cloud computing environment 100, and billing or invoicing for consumption of these resources. In one example, these resources may include application software licenses. Security provides identity verification for cloud consumers and tasks, as well as protection for data and other resources. User portal 436 provides access to the cloud computing environment 100 for consumers and system administrators. Service level management 438, which includes containers, provides cloud computing resource allocation and management such that required service levels are met. Service Level Agreement (SLA) planning and fulfillment 440 provide pre-arrangement for, and procurement of, cloud computing resources for which a future requirement is anticipated in accordance with an SLA.

Workloads layer 442 provides examples of functionality for which the cloud computing environment 100 may be utilized. Examples of workloads, tasks and functions which may be provided from this layer include: mapping and navigation 444; software development and lifecycle management 446; virtual classroom education delivery 448; data analytics processing 450; transaction processing 452; etc. More specifically, this layer includes the workloads, tasks and functions for social media tag suggestion based on image recognition, as described above.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

Conclusion

This concludes the description of the various embodiments of the present invention. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Since many embodiments of the invention can be made without departing from the spirit and scope of the invention, the invention resides in the claims hereinafter appended.

What is claimed is:

1. A computer-implemented method, comprising:
suggesting a trending hashtag for a social media post based on image recognition and text analytics of the social media post, by:
accessing the social media post including text and a media object from the social media post;
performing the text analytics on the text, wherein performing the text analytics comprises extracting one or more entities, relationships, keywords, semantic roles from text associated with the social media post;
performing the image recognition on the media object, wherein performing the image recognition comprises identifying one or more contents of the media object;
generating a list of one or more suggested hashtags based on the text analytics and the image recognition;
comparing the generated list with trending hashtags currently used on social media;
determining one or more hashtags from the generated list that are trending hashtags currently used on the social media;
suggesting the determined one or more hashtags; and
issuing a warning in response to determining no hashtags from the generated list are trending hashtags currently used on the social media.

2. The method of claim 1, further comprising:
presenting the determined one or more hashtags to a user for selection, and
receiving a selection by the user of the determined one or more hashtags, wherein the selected one or more hashtags are overlaid on the media object.

3. The method of claim 2, further comprising:
capturing the selected one or more hashtags for use in updating a statistical model used to present the one or more hashtags to the user for selection.

4. The method of claim 2, further comprising:
capturing the selected one or more hashtags selected by the user for use in training the image recognition.

5. The method of claim 1, wherein the determined one or more hashtags are presented to a user for selection by: type-ahead, type-ahead replacement, drop-down list, hover or after-tag suggestion.

6. A computer system comprising:
one or more computer processors, one or more computer-readable storage media, and program instructions stored on the one or more computer-readable storage media for execution by at least one of the one or more computer processors, the computer system programed to:
suggest a trending hashtag for a social media post based on image recognition and text analytics of the social media post, by:
access the social media post including text and a media object from the social media post;
perform the text analytics on the text, wherein performing the text analytics comprises extracting one or more entities, relationships, keywords, semantic roles from text associated with the social media post;
perform the image recognition on the media object, wherein performing the image recognition comprises identifying one or more contents of the media object;
generate a list of one or more suggested hashtags based on the text analytics and the image recognition;
compare the generated list with trending hashtags currently used on social media;
determining one or more hashtags from the generated list that are trending hashtags currently used on the social media;
suggesting the determined one or more hashtags; and issuing a warning in response to determining no hashtags from the generated list are trending hashtags currently used on the social media.

7. The computer system of claim 6, the server computer further programed to:
   present the determined one or more hashtags to a user for selection, and
   receive a selection by the user of the determined one or more hashtags, wherein the selected one or more hashtags are overlaid on the media object.

8. The computer system of claim 7, the server computer further programed to:
   capture the selected one or more hashtags for use in updating a statistical model used to present the one or more hashtags to the user for selection.

9. The computer system of claim 7, the server computer further programed to:
   capture the selected one or more hashtags selected by the user for use in training the image recognition.

10. The computer system of claim 6, wherein the determined one or more hashtags are presented to a user for selection by: type-ahead, type-ahead replacement, drop-down list, hover or after-tag suggestion.

11. A computer program product comprising a computer readable storage medium having program instructions embodied therewith, the program instructions executable by a processor to cause the processor to perform a method comprising:
   program instructions to suggest a trending hashtag for a social media post based on image recognition and text analytics of the social media post, by:
      accessing the social media post including text and a media object from the social media post;
      performing the text analytics on the text, wherein performing the text analytics comprises extracting one or more entities, relationships, keywords, semantic roles from text associated with the social media post;
      performing the image recognition on the media object, wherein performing the image recognition comprises identifying one or more contents of the media object;
      generating a list of one or more suggested hashtags based on the text analytics and the image recognition;
      comparing the generated list with trending hashtags currently used on social media;
      determining one or more hashtags from the generated list that are trending hashtags currently used on the social media;
      suggesting the determined one or more hashtags; and
      issuing a warning in response to determining no hashtags from the generated list are trending hashtags currently used on the social media.

12. The computer program product of claim 11, further comprising:
   presenting the determined one or more hashtags to a user for selection, and
   receiving a selection by the user of the determined one or more hashtags, wherein the selected one or more hashtags are overlaid on the media object.

13. The computer program product of claim 12, further comprising:
   capturing the selected one or more hashtags for use in updating a statistical model used to present the one or more hashtags to the user for selection.

14. The computer program product of claim 12, further comprising:
   capturing the selected one or more hashtags selected by the user for use in training the image recognition.

15. The computer program product of claim 11, wherein the determined one or more hashtags are presented to a user for selection by: type-ahead, type-ahead replacement, drop-down list, hover or after-tag suggestion.

* * * * *